United States Patent
Lee et al.

(10) Patent No.: US 8,151,289 B2
(45) Date of Patent: Apr. 3, 2012

(54) OPTICAL DISK HAVING A PROJECTION WITH LATERAL INCLINED SURFACE

(75) Inventors: Seoung Won Lee, Daejeon-si (KR); Hun Seo, Yongin-si (KR); Jun Seok Lee, Chungcheongbuk-do (KR); Jin Hong Kim, Yongin-si (KR); Kyung Chan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/700,904

(22) Filed: Feb. 1, 2007

(65) Prior Publication Data

US 2007/0136738 A1    Jun. 14, 2007

(30) Foreign Application Priority Data

Sep. 10, 2002 (KR) .................................. 2002-54603

(51) Int. Cl.
*G11B 7/24* (2006.01)
(52) U.S. Cl. ....................................................... 720/722
(58) Field of Classification Search .................. 720/721, 720/724, 722
See application file for complete search history.

(56) References Cited

U.S. PATENT DOCUMENTS

| 5,323,381 | A | * | 6/1994 | Takahashi et al. | ............. | 369/282 |
| 5,859,834 | A | * | 1/1999 | Takahashi et al. | ............. | 720/723 |
| 5,999,512 | A |   | 12/1999 | Furuta |   |   |
| 5,999,513 | A | * | 12/1999 | Arakawa et al. | ............. | 369/282 |
| 6,011,771 | A |   | 1/2000 | Akama |   |   |
| 2001/0043555 | A1 | * | 11/2001 | Hisada et al. | ................. | 369/290 |

FOREIGN PATENT DOCUMENTS

| EP | 0497604 | 1/1992 |
| JP | 1-173691 | 7/1989 |
| JP | 04-095241 | 3/1992 |
| JP | 08-203115 | 8/1996 |
| JP | 8-235638 | 9/1996 |
| JP | 2001-167472 | 6/2001 |
| KR | 10-2000-0051973 A | 8/2000 |
| KR | 10-2001-0098871 A | 11/2001 |
| TW | 374902 | 11/1999 |

OTHER PUBLICATIONS

Office Action issued Apr. 30, 2008 by the Taiwanese Patent Office in counterpart Taiwan Patent Application No. 092109032.
Office Action issued Jul. 26, 2010 in counterpart European Patent Application No. 03719242.4.
Japanese Trial Decision dated Nov. 30, 2010.

* cited by examiner

*Primary Examiner* — David D Davis
(74) *Attorney, Agent, or Firm* — Harness, Dickey & Pierce, P.L.C.

(57) ABSTRACT

The present invention is directed to an optical disk having a projection that prevents full contact of the upper surface of the disk when engaging a supporting surface. The optical disk includes a projection formed in a central portion of the optical disk that abuts or is near the upper surface of a protecting layer.

4 Claims, 4 Drawing Sheets

OPTICAL DISK HAVING A PROJECTION WITH LATERAL INCLINED SURFACE

PRIORITY STATEMENT

The application claims priority under 35 U.S.C. §120 upon U.S. application Ser. No. 10/419,160, filed Apr. 21, 2003 now U.S. Pat. No. 7,197,756, the entirety of which is hereby incorporated by reference. This application claims the benefit of the Korean Application No. P2002-54603 filed on Sep. 10, 2002, the entirety of which is hereby incorporated by reference.

BACKGROUND OF THE PRESENT INVENTION

1. Field of the Present Invention

The present invention relates to an optical disk having a projection for preventing full contact of the recording side of the disk upon engagement with a supporting surface.

2. Description of the Related Art

Recently, optical disks having various structures with enhanced features and dramatically increased storage capacities have been developed to improve among other things, their recording density. The currently-used high density optical disks include DVD-R, DVD-RAM, and the like.

FIG. 1 and FIG. 2 illustrate diagrams of a high-density optical disk according to a related art and the dimensions of various elements. These figures show a disk 20 having a thickness of 1.2 mm and a diameter of 120 mm. A via hole 22 is formed at a central portion of the disk 20. The disk 20 has an outer recording layer 10 and a central portion 24 of the disk 20 having the via hole 22. A diameter of the via hole is about 15 mm, and a diameter of the central portion is about 44 mm. The recording layer 10 is formed at a location about 0.1 mm far from a surface of the disk 20 on which light is incident.

In the illustrated disk, a protecting layer 30 is formed on the recording layer 10 to protect the recording layer 10. The protecting layer 30 is formed by attaching a transparent plastic film such as a polycarbonate sheet to the recording layer 10 or spin-coating a UV-hardening resin on the recording layer 10.

The process of spin-coating on the protecting layer 30 is explained as follows.

First, a UV-hardening resin in a liquid state is dropped on the recording layer 10 adjacent to the central portion 24 of the disk 20. The disk 20 is then rotated at a predetermined spin speed based, in part, on the viscosity of the resin. The spinning disk causes the UV-hardening resin to spread across the recording layer 10 from the central portion to the circumference in response to centrifugal force. Once the resin spreads across the surface of the recording layer 10, the UV-hardening resin coated on the disk is hardened by exposing the resin to UV rays.

However, spin-coating fails to evenly distribute the UV-hardening resin across on the recording layer 10 in creating a protecting layer of a uniform thickness. Instead, as illustrated in FIG. 1, the thickness of the UV-hardening resin formed on the recording layer 10 becomes thicker as the protecting layer 10 approaches the outer circumference of the disk 20.

Hence, thickness deviations in the protecting layer 30 interfere with the recording/reading of information on/from the recording layer 10.

SUMMARY OF THE PRESENT INVENTION

Accordingly, the present invention is directed to an optical disk that substantially obviates one or more problems due to limitations and disadvantages of the related art.

An object of the present invention is to provide an optical disk enabling with a protecting layer having a uniform thickness thereon.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

An embodiment of the present invention provides an optical disk comprising: a center hole; a first side being an entrance surface with respect to a light beam and a second side, opposite to the first side, being a non-entrance surface; a recordable first area and a non-recordable second area; a recording layer located at about 0.1 mm above the surface of the first side; and a projection extending from the surface of the first side on the non-recordable second area; wherein the projection formed near the center hole has at least one inclined lateral side and the height of the projection is equal to or smaller than 0.6 mm.

An embodiment of the present invention provides a method for coating a protective layer on an optical disc, the method comprising: dropping a liquefied coating material at one side of a projection of the optical disc; revolving the optical disc; and hardening the liquefied coating material uniformly spread on the optical disc.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PRESENT INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
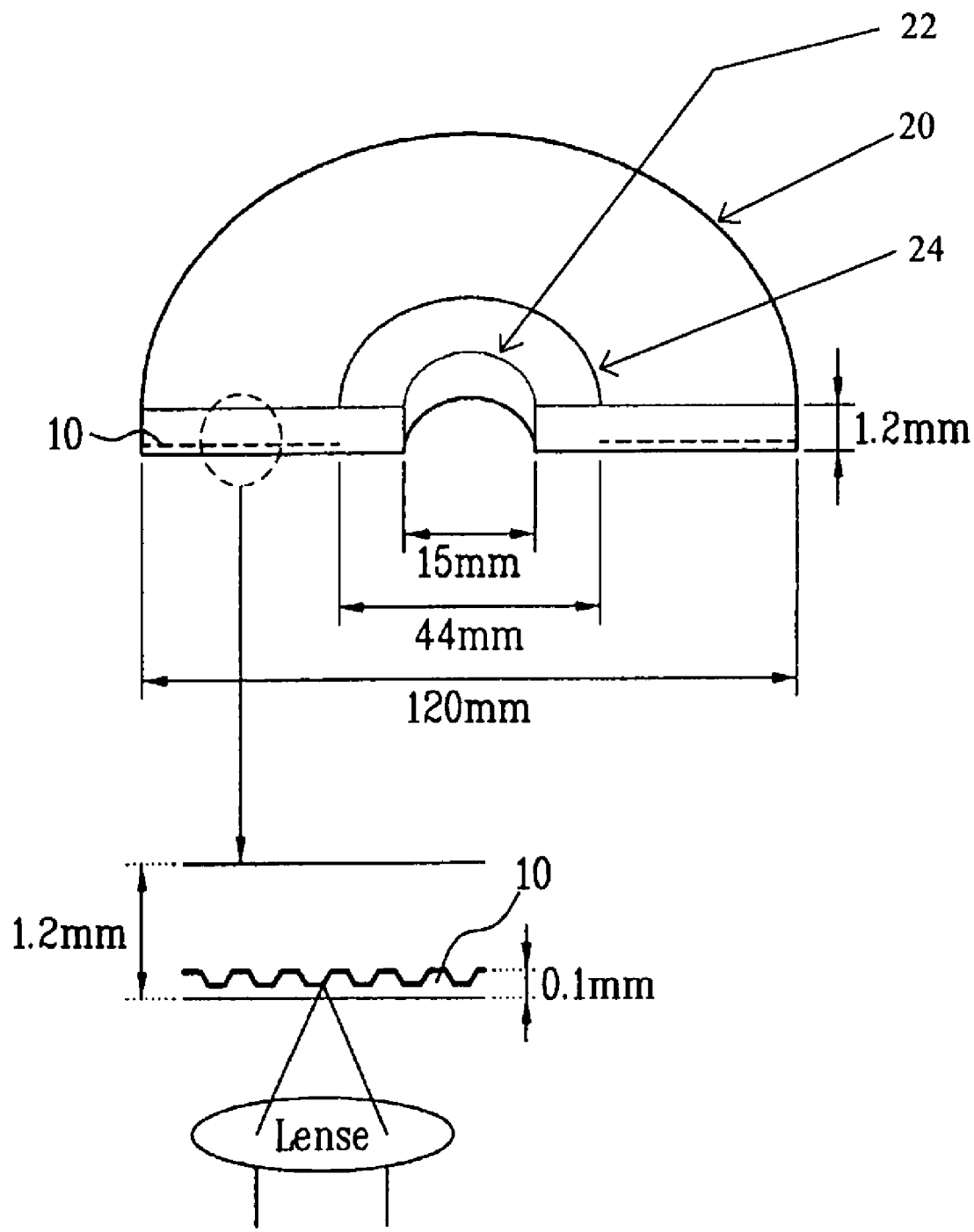
FIG. 1 and FIG. 2 illustrate diagrams of a high-density optical disk according to a related art.
Figure 2:
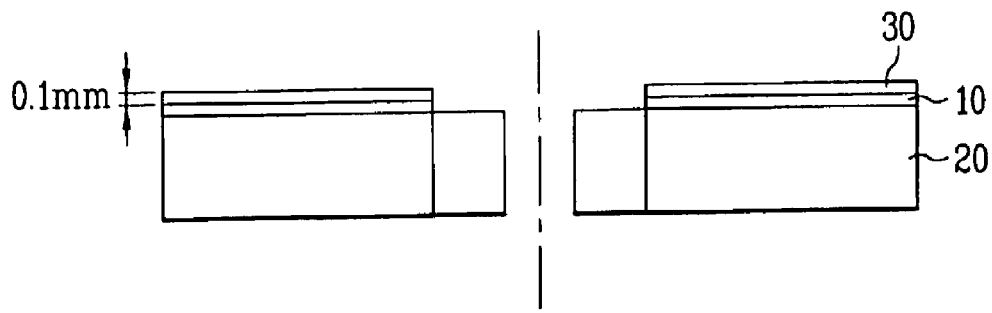
Figure 3:
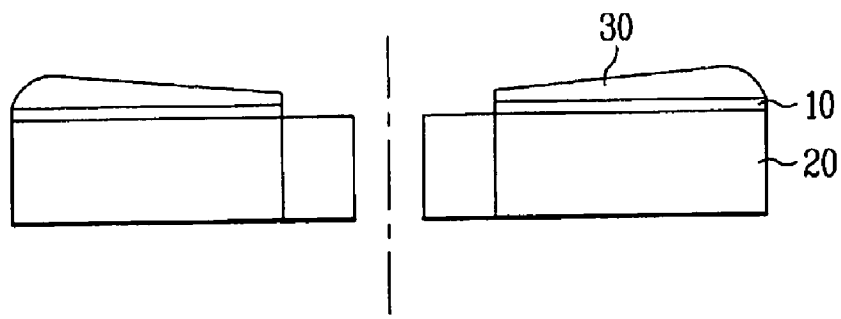
FIG. 3 illustrates a diagram of a thickness of a protecting layer formed by spin coating.
Figure 4:
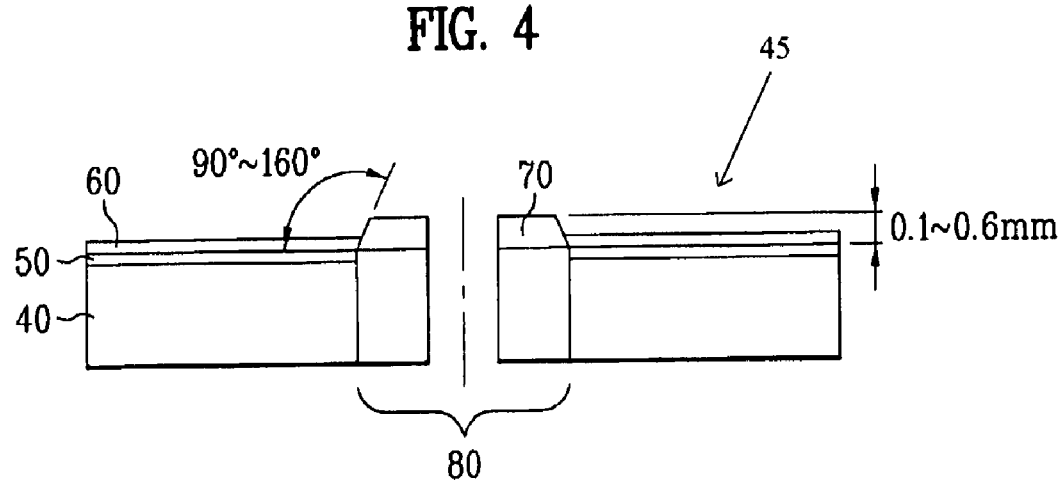
FIGS. 4 to 6 illustrate cross-sectional views of optical disks according to embodiments of the present invention.
Figure 5:
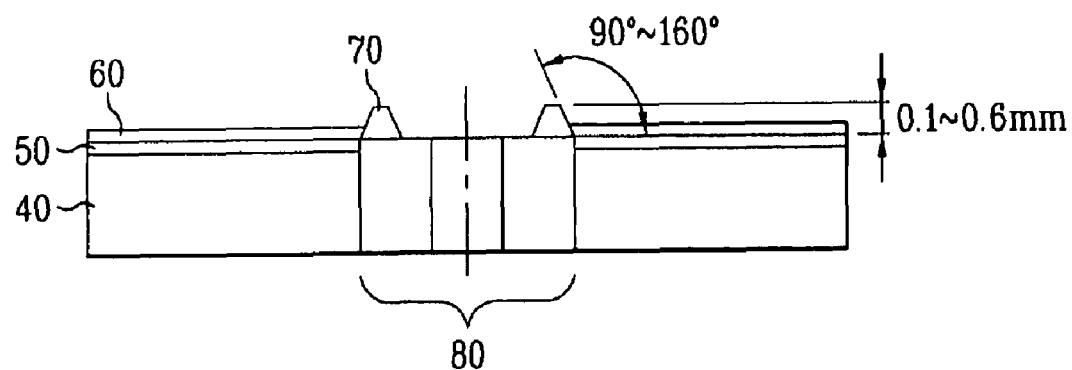
Figure 6:
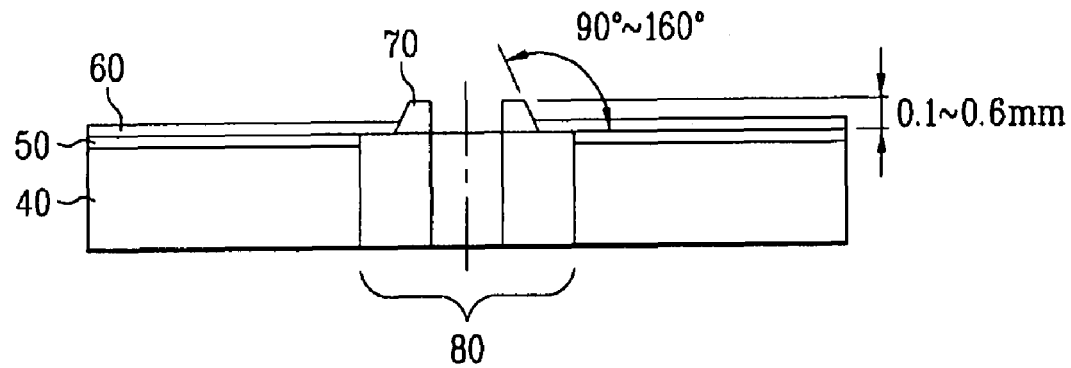

FIGS. 4 to 6 illustrate cross-sectional views of optical disks according to preferred embodiments of the present invention that include various configurations of a projection that facilitates fabrication of the protecting layer and provides protection for the recording surface of the disk once formed.

These figure illustrate an optical disk 45 according to the present invention that includes a first area for recording information thereon and a second area that is not used to record information.

The first area extends to the circumferential edge of the optical disk. In each of the various embodiments, the first area includes a recording layer 50 that is covered by a protecting layer 60. Both of the recording and protecting layers are supported on a substrate, or plate 40.

The second area is located inside the first area of the optical disk in a central portion 80 of the plate 40. In contrast with the first area, neither the protecting layer 50 nor the recording layer 60 extends into the second area. The second area is non-recordable. As reflected in each of the figures, the second area also includes a via hole formed in the central portion 80 of the plate 40 near the rotational center of the optical disk 45.

The second area of the optical disk 20 also includes a projection 70 formed near the circumferential outer edge of the central portion 80. The projection is formed to accomplish at least two functions. As explained later, the structure of the projection facilitates fabrication of the optical disk by preventing material for collecting in the central portion of the disk, such as during the processing of spinning resin to form a protecting layer.

Additionally, the projection serves the function of protecting the recording surface of the desk from scratches and other damages. Each embodiment of the projection is designed to prevent full impact of the disk when engaging a supporting surface, such as the ground.

FIG. 4 illustrates a first preferred embodiment of an optical disk with the projection. There, the projection 70 is formed to have at least one lateral side, which is inclined. A flank angle of the projection 70 is preferably formed to be about 90~160°. The flank angle of the projection 70 is defined as the angle formed between the upper surface of the recording layer 10 and the lateral side of the projection 70 where the vertex of the angle is located at the intersection of the inner circumferential edge of the upper surface of recording layer 50 with the control portion 80. The upper surface of the projection 70 is formed to be higher than the upper surface of the protecting layer 60. For example, when the optical disk has a thickness of 1.2 mm, a diameter of 120 mm, a diameter of the via hole of about 15 mm, and a diameter of the central portion of about 44 mm, a height of the projection 70 is preferably about 0.1~0.6 mm.

FIG. 5 shows a second preferred embodiment of the optical disk 20 where the projection 70 is similar to the embodiment shown in FIG. 4 except the projection 70 includes a second lateral side formed on an inner lateral wall of the projection that is also angled. In a related example, the flank angle of the inner lateral projection wall is equal to the flank angle of the outer lateral projection wall. In this embodiment, the flank angle of the inner wall is measured between the upper surface of the central portion and the inner lateral projection wall.

FIG. 6 shows a third preferred embodiment of an optical disk having a projection that is similar to the preferred embodiment of FIG. 4 except the base of the outer projection wall is offset from the protecting layer 50. In one example, the vertex of the flank angle occurs nearer the center of the optical disk. One side of the flank angle is defined by the upper surface of the central portion 80 that is parallel to the upper surface of the protecting layer 50.

A process for fabricating an optical disk in accordance with a preferred embodiment of the present invention having the step of spin-coating a material for forming the protecting layer 60 on the disk having the projection 70 thereon is explained as follows.

Figure 7A:
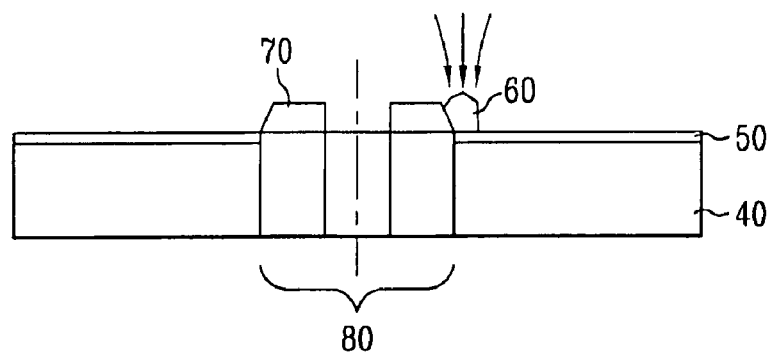
FIG. 7A and FIG. 7B illustrate cross-sectional views of a process of forming a protecting layer of an optical disk according to the present invention.
Figure 7B:
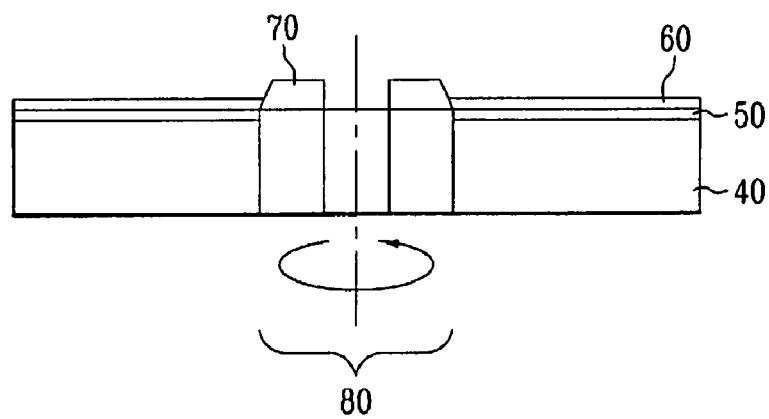
Figure 8:
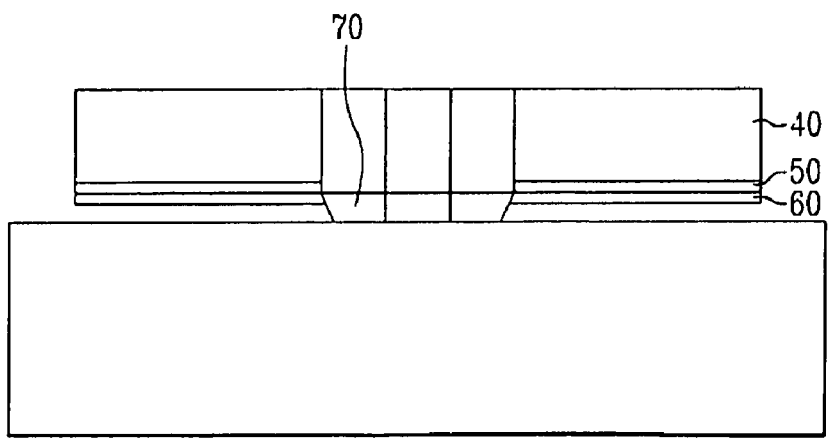
FIG. 8 illustrates a diagram for protecting a disk surface by a projection of an optical disk according to the present invention.

FIG. 7A and FIG. 7B illustrate cross-sectional views of the constituent elements of an optical disk formed by a process according to the present invention.

Referring to FIG. 7A, a liquefied UV-hardening resin 60 is dropped on a recording layer 50 near the projection 70.

Referring to FIG. 7B, the optical disk is spun causing centrifugal force to move the UV-hardening resin coated on the disk from the center portion toward the outer circumferential edge of the first area. The coated UV-hardening resin is then hardened by UV light.

When the step of spin-coating is carried out on the UV-hardening resin, the projection 70 having an inclined lateral side prevents the liquefied UV-hardening resin from flowing into and collecting within the central portion of the disk.

Moreover, the projection 70 maintains a uniform flow of the liquefied UV-hardening resin during spin-coating, thereby enabling the process to form a protecting layer 60 that is uniform in thickness.

It will be apparent to those skilled in the art that various modifications and variations can be made in the present invention. Thus, it is intended that the present invention covers the modifications and variations of this present invention provided they come within the scope of the appended claims and their equivalents.

What is claimed:

1. An optical disk comprising:
    a center hole;
    a first side being an entrance surface with respect to a light beam and a second side, opposite to the first side, being a non-entrance surface;
    a first area and a second area on the first side;
    a recording layer located at about 0.1 mm below the surface of the first side; and
    a projection extending from the surface of the first side on the second area, the projection being located in a diameter equal to or greater than 17 mm and equal to or less than 21 mm;
    wherein the second area is provided between the center hole and the first area, with an inner diameter of larger than 15 mm and an outer diameter of smaller than 44 mm, wherein the first area is provided with an inner diameter that is larger than the outer diameter of the second area,
    the projection is formed on a first portion of the second area, the first portion being located at a diameter of larger than 15 mm and nearer the center hole than the first area, and at least a second portion on which the projection is not formed is remained on the second area,
    the projection having an upper side and a bottom side, width of the upper side being smaller than the bottom side, and both lateral portions of the projection being gradually inclined from an end of the upper side to an end of the bottom side,
    and the height of the upper side of the projection is equal to or smaller than 0.6 mm, and a flank angle of the projection is greater than 90 degrees and less than 160 degrees,
    and the projection is configured to prevent the first side from direct contact with a surface on which the optical disk is placed.

2. The optical disk of claim 1, wherein the first area is recordable.

3. The optical disk of claim 1, wherein the second area is non-recordable.

4. The optical disk of claim 1, wherein the projection is continuous.

* * * * *